United States Patent [19]
Werner

[11] Patent Number: 6,099,191
[45] Date of Patent: Aug. 8, 2000

[54] POWER TAKE OFF SHAFT SAFETY RETAINER

[76] Inventor: Raymond W. Werner, 210 S. Locust, Winfield, Iowa 52659

[21] Appl. No.: 09/168,169

[22] Filed: Oct. 8, 1998

[51] Int. Cl.[7] .............................. F16C 1/26; F16D 3/84
[52] U.S. Cl. .......................... 403/24; 403/315; 464/176; 74/11
[58] Field of Search ............................. 403/24, 23, 315, 403/316; 464/176; 74/11, 15.69; 56/14.7, 15.1, 15.3

[56] References Cited

U.S. PATENT DOCUMENTS

| | | | |
|---|---|---|---|
| 1,478,953 | 12/1923 | Happ et al. . | |
| 1,772,062 | 8/1930 | Zifferer | 248/62 |
| 3,066,904 | 12/1962 | Cook et al. | 248/62 |
| 3,389,763 | 6/1968 | Meinert . | |
| 4,020,913 | 5/1977 | Yatcilla | 74/15.69 |
| 4,058,990 | 11/1977 | Von Allworden | 64/1 S |
| 4,078,752 | 3/1978 | Kindorf | 248/62 |
| 4,308,931 | 1/1982 | Khanna . | |
| 4,432,742 | 2/1984 | Hartman . | |
| 4,553,950 | 11/1985 | Teich . | |
| 4,568,313 | 2/1986 | Diffenderfer et al. . | |
| 4,663,984 | 5/1987 | Taylor . | |
| 4,761,152 | 8/1988 | Wagenbach, Jr. . | |
| 4,767,087 | 8/1988 | Combu | 248/62 |
| 5,674,129 | 10/1997 | Burns et al. . | |

Primary Examiner—Terry Lee Melius
Assistant Examiner—Kenneth Thompson
Attorney, Agent, or Firm—Richard C. Litman

[57] ABSTRACT

A power take off (PTO) shaft safety retainer provides for the retention of the output end of a PTO shaft at its connection to a driven machine, in the event of accidental disconnection of the output end of the shaft from the driven machinery due to breakage of a U-joint, dislodging of a safety pin, failure of the gearbox, etc. The device essentially comprises an attachment to the relatively stationary portion of the driven machine, with an arm or strut extending therefrom and supporting a selectively openable retaining band adjusted to surround the PTO shaft near its connection with the driven machinery. The attachment and strut are axially offset from the axis of the PTO shaft, in order to avoid interference with the connection of the shaft to the drive means of the driven machinery. The attachment may be removably or permanently secured to the machinery by opposed flanges and bolts, over center latches, hinges with removable pins, or welded, etc., as desired. Similar removable attachments may be used to secure the openable retaining band about the PTO shaft. The band is supported clear of the connection end of the PTO shaft and provides clearance around the shaft, to avoid frictional contact with the shaft during operation. The device provides additional safety for various types of farm and other machinery, such as grain augers, vacuums and other farm machinery, and/or saw mills, portable or permanently assembled amusement rides, and other similar devices incorporating open shaft drives.

19 Claims, 3 Drawing Sheets

POWER TAKE OFF SHAFT SAFETY RETAINER

BACKGROUND OF THE INVENTION

1. Field of the Invention

The present invention relates generally to safety devices for powered equipment, and more specifically to a safety retainer for installing at the output end of a power take off (PTO) shaft. The present safety guard or retainer secures to the article of equipment which is being powered by the PTO shaft, and serves to retain that end of the PTO shaft in the event of U-joint breakage or other problem leading to the accidental disconnection of the rotating PTO shaft(from the equipment being driven or powered.

2. Description of the Related Art

The modern farm utilizes a great number of auxiliary powered devices, ranging from grain augers and vacuums to livestock feed grinders and mixers and various other devices. In addition, there is a great deal of portable, or semi-portable, farm or other equipment which is powered by a remotely located powerplant. (combustion engine, electric motor, etc.) with a relatively long shaft extending from the powerplant to the driven equipment (carnival and amusement park rides, saw mills, generators, etc.).

In the case of farm equipment, a single powerplant may be used to power such equipment, with the operator moving the powerplant to the desired article of equipment requiring power for any given operation. In fact, such a procedure is nearly universally used today, with the portable powerplant comprising a tractor with a selectively engageable power take off (PTO) drive off the rear differential. The procedure used is to position the tractor near the machinery to be driven, connect the power take off shaft to the power take off output of the tractor and to the article of equipment to be powered, and engage the power take off drive of the tractor. Other equipment (portable circus and carnival rides, portable sawmills, etc.) are operated in much the same manner, with the exception that the power source may not be capable of moving under its own power, but may have to be positioned by another vehicle.

An important consideration of such equipment, is the rotation of the power take off shaft when the machinery is in operation. Accordingly, various guards have been developed in the past, as will be seen in the discussion of the related art further below. Also, on rare occasions the power take off shaft will separate from either the driven end (i.e., the end at the power source) or the output end (i.e., the end at the equipment being driven), due to breakage of a U-joint, loss or breakage of a connector pin, or even a possible gearbox failure, which would allow the shaft to slip from the gearbox.

Accordingly, tractors are almost universally equipped with PTO output safety guards of some sort, generally comprising a three sided box, enclosing the PTO output area of the tractor on the top and both sides. This is beneficial in providing protection to the tractor operator, but does nothing for safety at the opposite end of the PTO shaft. It will be seen that when the PTO shaft disengages at the driven end, that it will eventually come to rest due to the removal of power from the machine linkage (with mechanical inertia perhaps continuing to cause machinery movement for some period of time.)

However, disconnection of the PTO shaft at the output end, distal from the powerplant, allows the PTO shaft to continue to whip around under power from the power source (tractor, stationary powerplant, etc.). Such shafts are relatively massive, weighing perhaps fifty pounds or more depending upon their length and diameter, in order to transmit the perhaps several hundred pound-feet of torque which may be developed by the powerplant. Not only does this pose a great potential hazard, but it can be most difficult, if not impossible, for an operator to reach the powerplant to shut down operation under the circumstances. Indeed, the present inventor is aware of at least one fatal accident which occurred to a close friend under the circumstances described, when the output end of a PTO shaft separated from the device being driven and whipped violently, striking the operator.

Yet, very little development has occurred in guards or retainers for the output end of a PTO shaft, distal from the driven end at the powerplant. This is perhaps due to the wide variety of equipment which is powered by such mechanisms, and the difficulty in providing a universal guard or shaft retainer for such devices. Accordingly, a need will be seen for power take off (PTO) shaft safety guard or retainer which is removably or permanently installable on a variety of different equipment, adjacent the PTO shaft input to that equipment. The guard or retainer must serve to retain the output end of the PTO shaft opposite its powered end, i.e., the end attached to the powerplant or drive system, to retail the output end of the shaft in the event of mechanical breakage or accidental disconnection of the shaft from the device being driven by the shaft, when the equipment is being operated and the shaft is turning. A discussion of the related art of which the present inventor is aware, and its differences and distinctions from the present invention, is provided below.

U.S. Pat. No. 1,478,953 issued on Dec. 25, 1923 to Leonard Happ et al., titled "Guard," describes a conical screen for guarding the flyweights of an open speed governor mechanism. A stationary rod affixed to an overhead structure passes through the apex of the cone, with the cone being adjustably positionable on the rod. The stationary rod precludes passage of a PTO shaft through the cone, with the result being that the Happ et al. device cannot be used to preclude lateral movement of a rotary PTO shaft passing therethrough, as provided by the present invention.

U.S. Pat. No. 3,389,763 issued on Jun. 25, 1968 to Harold W. Meinert, titled "Guard For Tractor Power Takeoff Shaft," describes a generally three sided guard with an open bottom, unlike the completely surrounding guard of the present invention. The Meinert guard is adapted for quickly removable attachment to the differential of a tractor, for ease of access to the PTO coupling mechanism. While the Meinert guard serves to protect the tractor operator from an upwardly projected powered or input end of a PTO shaft in the event that it accidentally becomes separated from the PTO output of the tractor for any reason while in operation, it does nothing to protect an operator at the output end of the PTO shaft when the assembly is being used to drive a stationary device of some sort.

U.S. Pat. No. 4,308,931 issued on Jan. 5, 1982 to Jagdish C. Khanna, titled "Guard For Drive Shaft In An Articulated Tractor," describes two independent guards, each of which partially surround the driveshaft of the articulated tractor. Each is affixed to a stationary component at each end of the driveshaft, and are configured to overlap without contact when the tractor is turned to produce an angle in the driveshaft. Each shield or guard covers only the top, left, and right sides of the driveshaft, with the bottom of the driveshaft being left unguarded, while the present guard or retainer surrounds the entire shaft near the output end thereof.

U.S. Pat. No. 4,432,742 issued on Feb. 21, 1984 to Wayne E. Hartman, titled "PTO Master Shield," describes a guard or shield covering the top, left, and right sides of a PTO output shaft, and somewhat resembling the guard of the Meinert '763 U.S. Patent discussed further above. Hartman provides an automatic release which rests upon the stationary PTO shaft, and drops the guard into position when the PTO shaft is rotated. However, the bottom of the guard is open, leaving the shaft unguarded in that direction, unlike the completely surrounding guard of the present invention. Moreover, the Hartman guard is hingedly secured directly to the same structure as the PTO shaft, while the present surrounding guard is supported by a strut extending from the mechanism receiving the PTO shaft, with clearance being defined between the encircling PTO shaft retainer and the structure to which the PTO shaft is connected.

U.S. Pat. No. 4,553,950 issued on Nov. 19, 1985 to Christian M. Teich, titled "Flip-Up Shield Assembly For Tractor Power Take-Off," describes a three sided shield having a slotted hinge arrangement. The shield may be adjustably positioned about the hinge pins by means of the slots, to provide clearance for larger U-joint guards on various PTO shafts when they are coupled to the PTO output. The hinged configuration requires that the bottom be left open for clearance in the raised position, unlike the completely surrounding retainer or guard of the present invention. Moreover, the device is secured directly to the PTO structure with no clearance therebetween, unlike the present invention.

U.S. Pat. No. 4,568,313 issued on Feb. 4, 1986 to Harold R. Diffenderfer et al., titled "Protective Guard For Articulated Shafting," describes a telescoping tube with a flexible bellows at each end thereof, for completely enclosing a PTO shaft and U-joints at each end thereof. The Diffenderfer et al. device is not connected to any other structure, and so rotates with the PTO shaft unless some other retaining means is provided, such as the non-rigid chain mentioned by Diffenderfer et al. In contrast, the present guard or retainer completely encircles the PTO shaft only at one point near its output attachment end, with the guard being rigidly connected to the fixed structure of the machinery being driven by the PTO shaft and defining a clearance therebetween.

U.S. Pat. No. 4,663,984 issued on May 12, 1987 to William Taylor, titled "Safety Guard For Power-Take-Off Shaft," describes an articulated bellows completely surrounding the entire shaft, including the U-joint couplings at each end thereof. Specialized housings are provided at the output and input respectively of the machinery powering and being powered by the PTO shaft, for specially configured flanges to secure thereto. A secondary, inner guard is provided surrounding the PTO shaft and inside the bellows, to preclude contact between the PTO shaft and the relatively stationary bellows. The Taylor device does not provide a rigid guard or retainer surrounding only a portion of the shaft and providing clearance between the retainer and the machinery being powered by the PTO shaft, as is accomplished by the present invention.

U.S. Pat. No. 4,761,152 issued on Aug. 2, 1988 to Gerald L. Wagenbach, Jr., titled "Foldable Power Take-Off Shaft Shield," describes a PTO guard secured directly to the PTO structure of a tractor. The device comprises two fixed side plates with a movable upper plate which is selectively positionable between a lowered and a raised state, depending upon the linkage between the upper plate and the side plates. The entire lower area of the device is open, unlike the completely surrounding guard or retainer of the present invention.

Finally, U.S. Pat. No. 5,674,129 issued on Oct. 7, 1997 to Stephen E. Burns et al., titled "Adjustable Shield For Power Take-Off Shaft," describes a shield having the same basic structure as that described immediately above in the Wagenbach, Jr. '152 U.S. Patent. The device has two immovably affixed side plates and a movable top plate, with the bottom of the guard structure remaining open, unlike the completely encircling retainer or guard of the present invention. The Burns et al. shield utilizes a different slot configuration than Wagenbach, Jr. for adjusting the position of the movable upper plate relative to the fixed side plates, but otherwise the distinctions between the Wagenbach, Jr. device and the present invention are also felt to apply here.

None of the above inventions and patents, taken either singly or in combination, is seen to describe the instant invention as claimed.

SUMMARY OF THE INVENTION

The present invention comprises a power take off (PTO) shaft safety retainer, for retaining the output end of a PTO shaft at its connection with driven machinery, in the event of accidental disconnection of the PTO shaft from the driven machinery. The retainer essentially comprises a stationary openable band which completely encircles and surrounds the PTO shaft near its connection to the driven machinery, with the band being supported by a strut or arm extending from a removable attachment to some relatively stationary component of the driven machinery. The band is preferably axially offset from the axis of the PTO shaft, in order to avoid interference with the PTO shaft.

The means for securing the device to the driven machinery may comprise an openable band having opposed flanges bolted together, an over center clamp, removable pin secured by a hitch pin, or any other suitable arrangement. Alternatively, the attachment may be permanently affixed (e.g., welded, etc.) to the driven machinery, if so desired. The encircling retainer is preferably adjustably affixed to the end of the support arm, for adjusting the clearance from the PTO shaft as required. Similar means may be used to secure the components of the openable band together about the PTO shaft, as those described above for securing the device to the driven machinery.

Accordingly, it is a principal object of the invention to provide an improved power take off shaft safety retainer for retaining the output end of a PTO shaft in the event of accidental disconnection of the shaft from the input of the driven machinery to which the PTO shaft is otherwise rotationally secured.

It is another object of the invention to provide an improved PTO shaft safety retainer including means for permanently or removably securing the retainer structure to the relatively stationary structure of the driven machinery.

It is a further object of the invention to provide an improved PTO shaft safety retainer having an arm or strut extending from the driven machinery attachment means, with the strut having a distal end supporting a selectively openable band for completely encircling the output end of a PTO shaft near its connection to the input of the driven machinery.

An additional object of the invention is to provide an improved PTO shaft safety retainer which band supporting strut is axially offset from the axis of the PTO shaft, for clearance from the shaft and its attachment to the driven machinery.

Still another object of the invention is to provide an improved PTO shaft safety retainer which fastening means may comprise cooperating flanges and bolts, hinges and hinge pins, over center latches, or other suitable means as desired.

Yet another object of the present invention is to provide an improved PTO shaft safety retainer which may be installed on the structure of stationary machinery being powered by a stationary power source, or which may be secured to the structure of moving machinery, such as a flail chopper or the like, being drawn by a moving power source, such as a tractor or the like.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
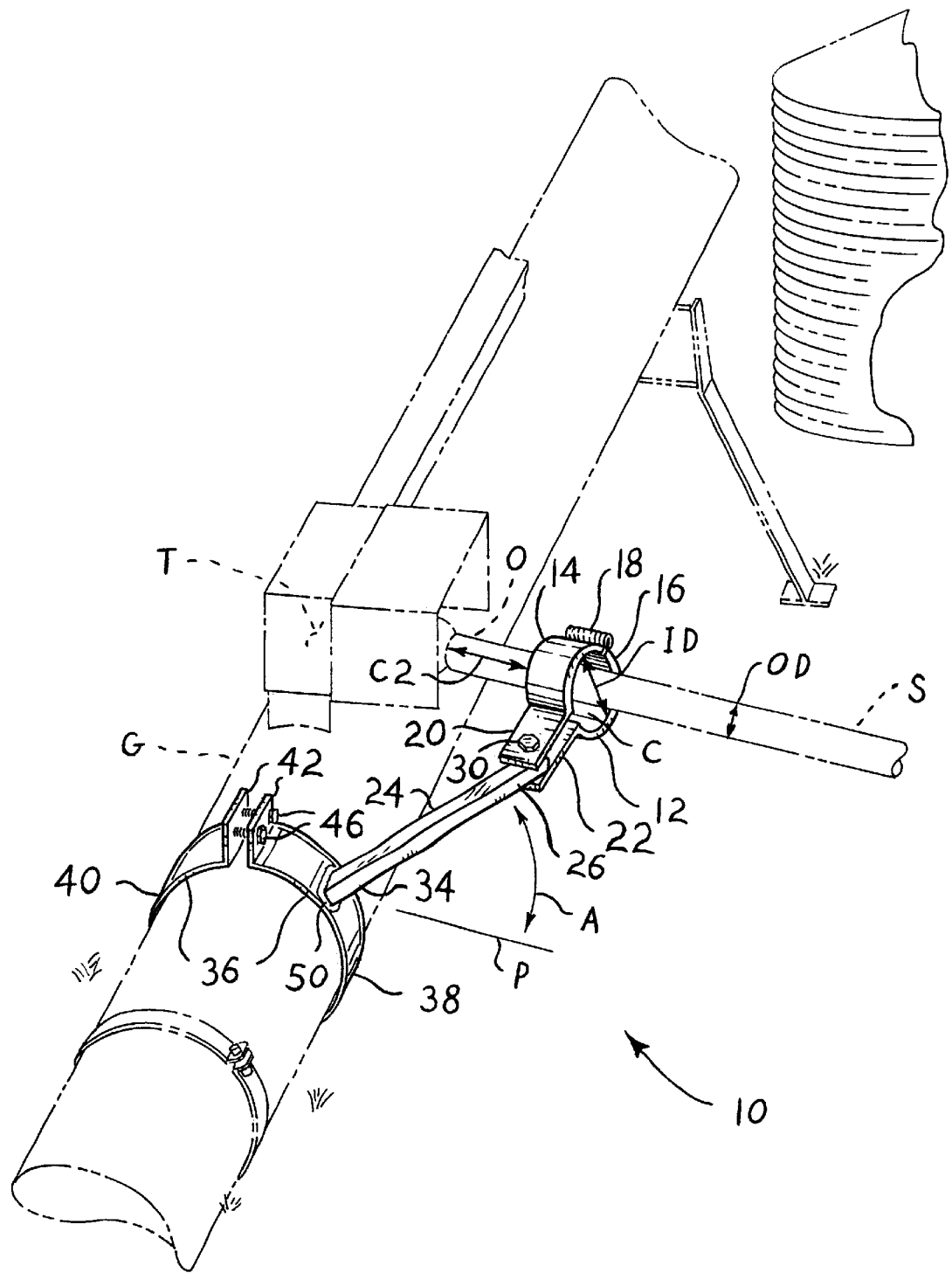
FIG. 1 is an environmental perspective view of the present power take off shaft safety retainer, showing its installation to a fixed machine and the PTO shaft encircling band.
Figure 2:
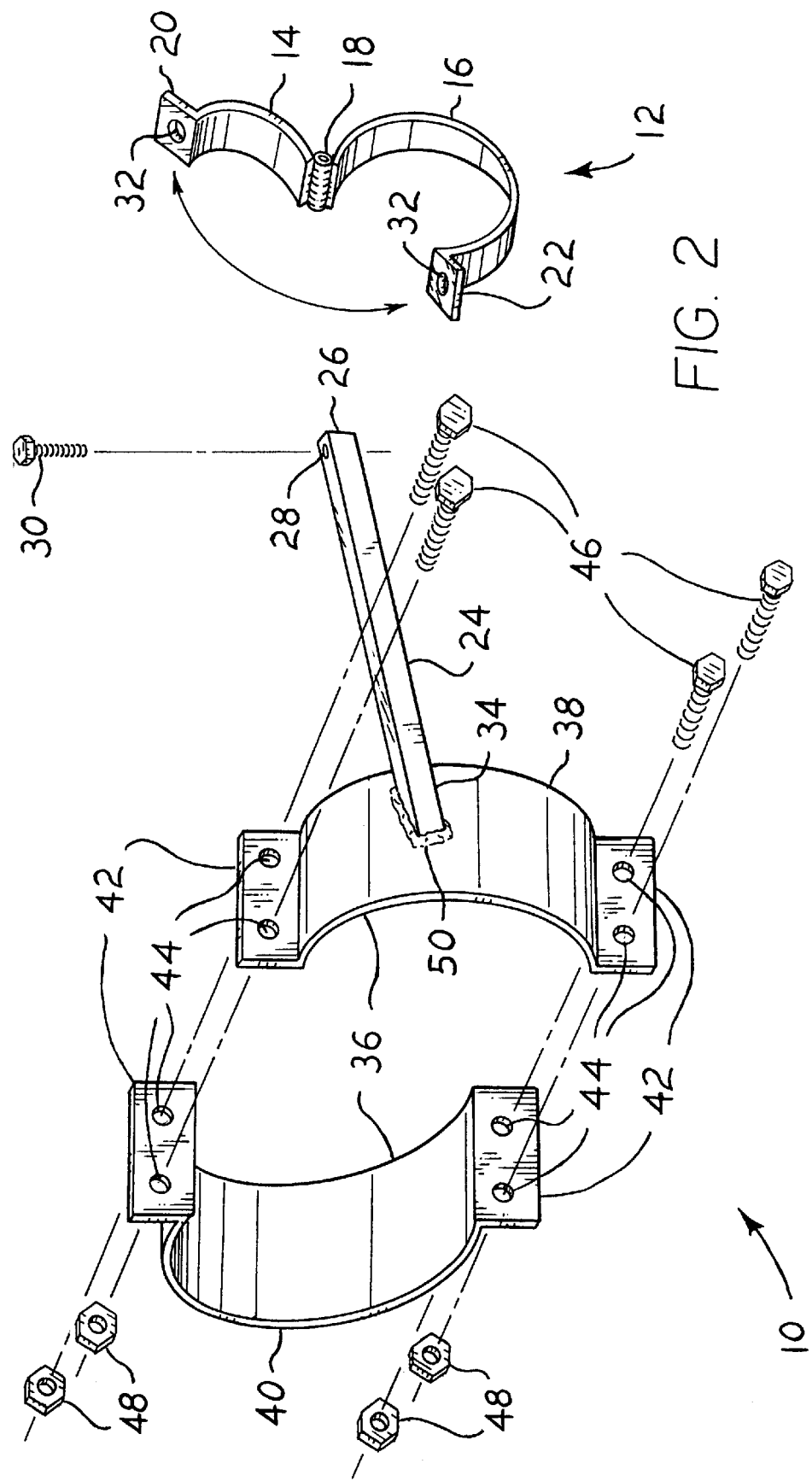
FIG. 2 is an exploded perspective view of the various components comprising the present safety retainer.

The present invention comprises a power take off (PTO) shaft safety retainer 10, shown installed on a power driven machine such as the grain auger G in FIG. 1. FIG. 2 provides an exploded perspective view of the safety retainer 10 of FIG. 1, showing further details thereof. The present safety retainer 10 serves to retain the output end O of a PTO shaft S, i.e., the end opposite the driven end attached to the power source, to prevent the whipping or flailing of the shaft S in the event of an accidental disconnect of the shaft output end O during operation.

The present safety retainer 10 includes a retaining band 12, which completely encircles the PTO shaft S near the output end O of the shaft S and defines an axially concentric power take off shaft passage therethrough. The retaining band 12 has an inner diameter ID which is somewhat larger than the outer diameter OD of the PTO shaft S, in order to provide a clearance C therearound and to avoid contact between the retaining band 12 and PTO shaft S. The retaining band 12 is also spaced from the output end O of the PTO shaft S to provide a clearance C2 between the band 12 and the output end O of the PTO shaft S and/or any of the conventional moving components (input shafts, transmission, auger, etc.) and/or relatively stationary components (e.g., the auger tube of the grain auger G shown in FIG. 1), thereby avoiding any direct contact between the retaining band 12 and other machinery components during normal operation.

The retaining band portion 12 of the present PTO shaft safety retainer 10 includes some means of opening or separating portions thereof, in order to install and remove the retainer 12 from around the PTO shaft S as desired.

Preferably, the retainer 12 comprises two opposite and generally semicircular portions, respectively 14 and 16, which are secured together by a hinge 18. Each of the portions 14 and 16 includes an extension flange, respectively 20 and 22, generally opposite the hinge 18 for selectively and adjustably closing the band 12 about the power take off shaft S and for securing the retaining band 12 to a support strut (discussed below) as desired. It will be seen that other means (not shown) of securing the retaining band 12 about the PTO shaft S may be used as desired, e.g., a conventional over center clamp, etc., as desired.

The extension flanges 20 and 22 of the band 12 are used to secure the band 12 adjustably and removably to an extension strut or arm 24. The extension strut 24 has a first end 26 with a hole 28 therethrough (FIG. 2), providing for a bolt or pin 30 to be passed therethrough and through mating holes 32 (FIG. 2) formed through each of the extension flanges 20 and 22 of the retaining band 12. The first end 26 of the extension strut 24 is sandwiched between the two extension flanges 20 and 22, and the bolt or pin 30 is inserted through their respective passages 28 and 32 to secure the retaining band 12 generally radially to the strut 24. The retaining band 12 may be adjusted arcuately about the bolt or pin 30 in order to position its axial center parallel to the axis of the PTO shaft S, aligned generally with the clearance arrow C2.

The opposite second end 34 of the extension strut or arm 24 is immovably affixed to the relatively stationary portion of the driven machine, e.g., about the tubular external structure of the grain auger G shown in FIG. 1, by appropriate attachment means. In a configuration such as a grain auger G, the strut attachment means preferably comprises a generally circular clamp 36 which may be secured about the grain auger tube. The clamp 36 is formed of a first and opposite second generally semicircular portion, respectively 38 and 40, each having a first and an opposite second end with a flange 42 extending therefrom. Each of the flanges 42 has at least one (preferably two or more, for additional mounting rigidity) bolt hole or passage 44 formed therethrough (FIG. 2), for the installation of a corresponding bolt 46 therethrough.

The two clamp portions 38 and 40 secure about the tubular auger structure by means of the bolts 46 and corresponding nuts 48 (FIG. 2), which clamp the corresponding flanges 42 together to clamp the assembly 36 securely and immovably about the auger tube. The second end 34 of the extension strut 24 is in turn immovably affixed to the clamp structure, e.g., to the first clamp portion 38, as by welding 50. Other means may be used to secure the clamp assembly 38 and/or strut 24 to the relatively stationary structure of the machinery, e.g., by a conventional over center clamp or latch (not shown), lateral pintles removably inserted through cooperating hinge eyes in lieu of the flanges 42, or the second end 34 of the strut 24 may be welded or otherwise directly affixed to the machine structure, where permanent installation is desired.

It should be noted that the extension strut 24 is not normal (i.e., perpendicular) to the stationary structure of the driven machine, but rather extends from the clamp member 38 and corresponding machine at an acute angle thereto, as indicated by the angular offset arrow A from a line P which is perpendicular to the clamp member 38 and machine. This provides clearance for the clamp or attachment assembly 38 from the gearbox or transmission T of the machine, while still allowing the PTO shaft S to be installed at approximately a right angle to the machine structure with the retaining band disposed about the PTO shaft S, as shown in FIG. 1. In other words, the clamp or attachment assembly 36 and its attached extension strut 24 are axially offset from the PTO shaft S (and the PTO passage of the retaining band 12, disposed about the PTO shaft), in order to provide clearance for the PTO shaft S to engage the gearbox or transmission T of the machine at approximately a right angle thereto.

Additional adjustment may be provided for the safety retainer 10 described above, e.g., pivotally attaching the second end 34 of the strut 24 to the machine attachment, providing a telescoping strut 24, etc., for further versatility and adaptability to different types of machines. Also, the means for securing the strut 24 to the driven machine structure may be modified, depending upon the machine (e.g., a plate bolted to the machine, etc.). Such modifications are deemed to be within the scope of the present disclosure, and provide adaptation for the present invention to a wide variety of machines powered by a remote source and PTO shaft.

Figure 3:
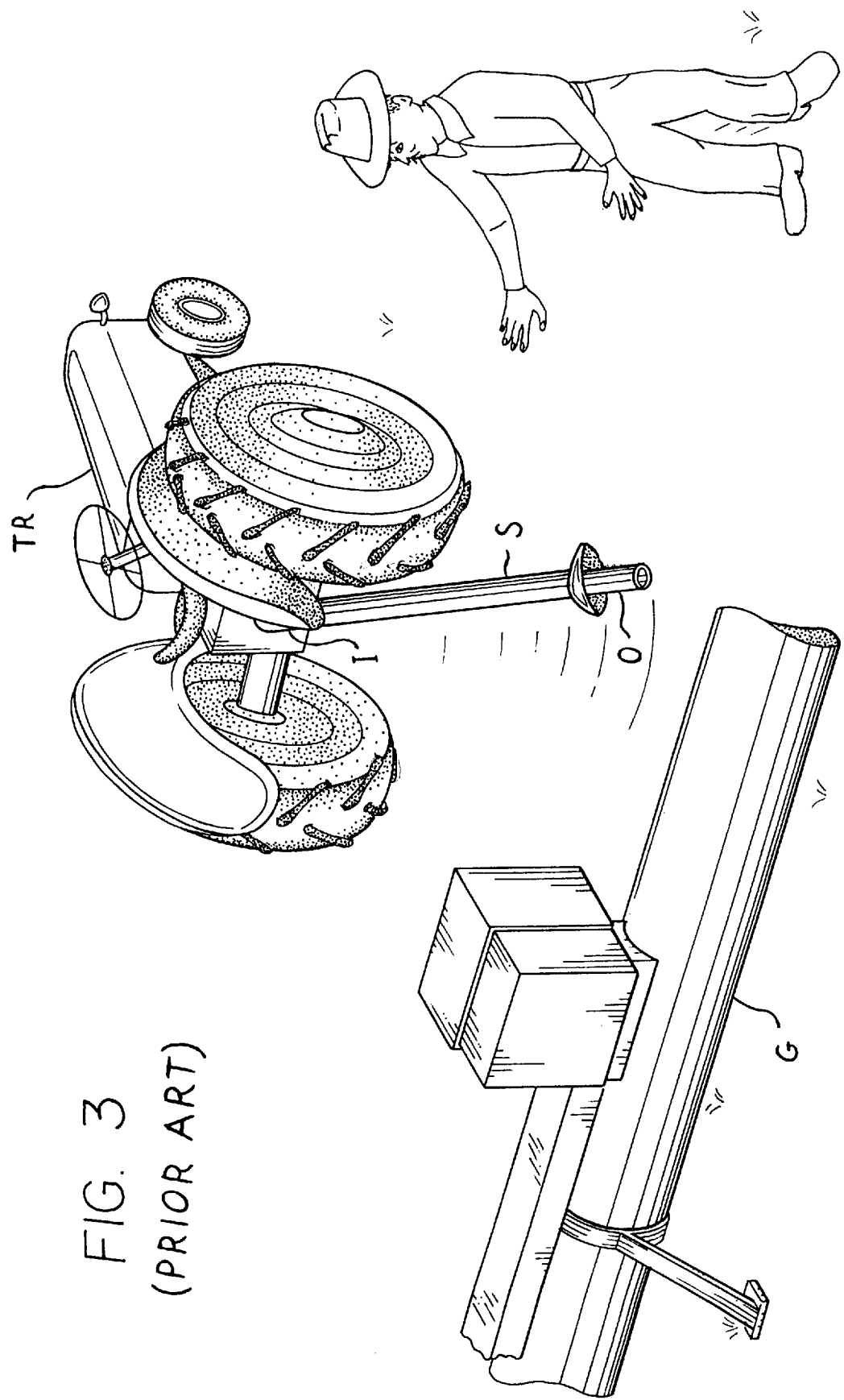
FIG. 3 is a perspective view of a prior art power take off operation, showing the accidental disconnection of the PTO shaft at its output end from the driven machinery, and the whipping of the disconnected PTO shaft and resultant hazards posed thereby.

The present PTO shaft safety retainer invention provides a solution for the hazardous problem illustrated in the prior art FIG. 3 of the drawings. PTO shafts being driven by a tractor TR or the like, are conventionally provided with some form of guard (not shown) about the PTO drive of the tractor, in order to preclude injury to an operator on or in the immediate vicinity of the tractor TR. If the PTO shaft coupling fails at this point, the input end I of the shaft S may drop to the ground, but will do little if any damage, as motive power to the shaft S is removed as soon as the coupling is disconnected.

However, little thought has been given to the problem of breakage or disconnection of the output end O of the PTO shaft S from the driven machinery, which problem is addressed by the present disclosure. In the prior art FIG. 3, the breakage or disconnection of the output end O of the PTO shaft S results in the violent whipping or flailing of the shaft S, endangering anyone in the immediate area. The problem is potentially even more hazardous than the breakage or disconnection of the input end I of the PTO shaft S from the tractor PTO drive, as when the PTO shaft is still connected to the tractor PTO drive, it is still receiving power, thus causing it to continue to whip and flail violently until the PTO drive from the tractor TR (or other power source for the PTO shaft) can be disengaged. This may be quite hazardous, due to the difficulty in approaching the power source due to the whipping action of the PTO shaft still connected thereto.

Accordingly, the present PTO shaft safety retainer invention provides a much needed solution to the above problem, by capturing and retaining the otherwise free output end of a PTO shaft which has become disconnected from the machinery which it was driving or powering. Yet, the present safety retainer does not interfere or impinge upon the PTO shaft during normal operation, as sufficient clearance is provided between the retaining band and the PTO shaft and its connection to the driven machinery, to avoid contact between the retaining band and shaft and/or machinery. The axially offset attachment of the safety retainer attachment and extension strut from the PTO shaft and its attachment to the driven machine, also avoid interference with the mechanism and permit the machinery to be operated normally.

The numerous variations in mounting or attaching the present safety retainer to a machine, as discussed further above, provide for use of the present invention on a wide variety of agricultural and other machines which may be powered from a remotely located power source and a PTO shaft. Thus, the present PTO shaft safety retainer invention will prove to be a most valuable safety device for machine operators in a wide variety of occupations and environments, from farming to amusement rides, sawmills, etc., wherever such machinery requires such a safety device.

It is to be understood that the present invention is not limited to the embodiments described above, but encompasses any and all embodiments within the scope of the following claims.

What is claimed is:

1. A power take off shaft safety retainer for retaining an output end of a power take off shaft at a driven machine in the event of disconnection of the output end of the shaft from the input to the driven machine during operation thereof, said power take off shaft safety retainer comprising:

a releasable retaining band for completely encircling a power take off shaft near an output end thereof, said retaining band being spaced apart from the power take off shaft;

a support strut having a first end and an opposite second end, with said first end connected to and generally radially disposed to said retaining band, wherein said support strut solely supports said retaining band about the power take off shaft; and attachment means for immovably securing said second end of said support strut to a driven machine.

2. The safety retainer according to claim 1, wherein:

said power take off shaft has an outer diameter;

said retaining band has an inner diameter relatively larger than the outer diameter of the power take off shaft, to define a clearance therebetween; and said retaining band is spaced apart from the output end of the power take off shaft to define a clearance therebetween, said retaining band being substantially free of any contact with the power take off shaft during operation thereof.

3. The safety retainer according to claim 1, wherein said retaining band includes means for selectively opening and closing about the power take off shaft as desired.

4. The safety retainer according to claim 3, wherein said means for opening and closing said retaining band comprises: said retaining band having a first and an opposite second. generally semicircular portion secured together by a hinge; and said first and said second portion each including an extension flange for selectively and adjustably closing said retaining band about the power take off shaft and for securing said retaining band to said first end of said strut as desired.

5. The safety retainer according to claim 1, wherein:

said attachment means for immovably securing said second end of said support strut to the driven machine includes a clamp for securing to the tubular structure of the driven machine;

said clamp comprising a first and an opposite second portion;

each said portion including a first and an opposite second end, with each said end having a flange extending therefrom; and each said flange including at least one bolt hole formed therethrough, for bolting each said first end of said first and said second portion and each said second end of said first and said second portion respectively together for immovably securing said clamp about the stationary tubular structure of the driven machine.

6. The safety retainer according to claim 1, wherein:

said retaining band defines an axially concentric power take off shaft passage therethrough; and said attachment means for immovably securing said second end of said support strut to the driven machine and said strut extending therefrom are axially offset from said power take off shaft passage of said retaining band, for providing clearance for the power take off shaft and its attachment to the driven machine.

7. The safety retainer according to claim 1, wherein said attachment means for immovably securing said second end of said support strut to the driven machine is permanently welded to the driven machine.

8. The safety retainer according to claim 1, wherein said attachment means for immovably securing said second end of said support strut to the driven machine is secured to the driven machine by an over center latch.

9. The safety retainer according to claim 1, wherein said attachment means for immovably securing said second end of said support strut to the driven machine is secured to the driven machine by a hinge and removable pintle.

10. A power driven machine, power take off shaft for providing power to said machine, and a power take off shaft safety retainer, comprising in combination:

a machine having at least one movably operating component, an input therefor, and an external structure disposed stationary relative to said at least one movably operating component and said input;

a power take off shaft having an output end connected to said at least one movably operating component and providing rotary power therefor;

a safety retainer for said power take off shaft for retaining said output end of said power take off shaft at said driven machine in the event of disconnection of said output end of said shaft from said input to said driven machine during operation thereof;

said safety retainer including a retaining band completely encircling said power take off shaft near said output end thereof;

a support strut having a first end and an opposite second end, with said first end connected to and generally radially disposed to said retaining band, wherein said support strut solely supports said retaining band about said power take off shaft; and attachment means for surrounding said external structure of said machine and for immovably securing said second end of said support strut to said machine.

11. The power driven machine, power take off shaft, and power take off shaft safety retainer combination of claim 10, wherein:

said power take off shaft has an outer diameter;

said retaining band has an inner diameter relatively larger than the outer diameter of said power take off shaft to define a clearance therebetween; and said retaining band is spaced apart from said output end of said power take off shaft to define a clearance therebetween, with said retaining band being substantially free of any contact with said power take off shaft during operation thereof.

12. The power driven machine, power take off shaft, and power take off shaft safety retainer combination of claim 10, wherein said retaining band includes means for selectively opening and closing about said power take off shaft as desired.

13. The power driven machine, power take off shaft, and power take off shaft safety retainer combination of claim 10, wherein said means for opening and closing said retaining band comprises:

said retaining band having a first and an opposite second generally semicircular portion secured together by a hinge; and said first and said second portion each including an extension flange for selectively and adjustably closing said retaining band about said power take off shaft and for securing said retaining band to said first end of said strut as desired.

14. The power driven machine, power take off shaft, and power take off shaft safety retainer combination of claim 10, wherein:

said external structure of said machine is tubular;

said attachment means for immovably securing said second end of said support strut to said driven machine comprises a clamp for securing to said tubular structure of said driven machine;

said clamp comprising a first and an opposite second portion;

each said portion including a first and an opposite second end, with each said end having a flange extending therefrom; and each said flange including at least one bolt hole formed therethrough, for bolting each said first end of said first and said second portion and each said second end of said first and said second portion respectively together for immovably securing said clamp about said tubular structure of said driven machine.

15. The power driven machine, power take off shaft, and power take off shaft safety retainer combination of claim 10, wherein:

said retaining band defines an axially concentric power take off shaft passage therethrough; and said attachment means for immovably securing said second end of said support strut to said driven machine and said strut extending therefrom are axially offset from said power take off shaft passage of said retaining band, for providing clearance for said power take off shaft and its attachment to said driven machine.

16. The power driven machine, power take off shaft, and power take off shaft safety retainer combination of claim 10, wherein said attachment means for immovably securing said second end of said support strut to said driven machine is permanently welded to said driven machine.

17. The power driven machine, power take off shaft, and power take off shaft safety retainer combination of claim 10, wherein said attachment means for immovably securing said second end of said support strut to said driven machine is secured to said driven machine by over center latch means.

18. The power driven machine, power take off shaft, and power take off shaft safety retainer combination of claim 10, wherein said attachment means for immovably securing said second end of said support strut to said driven machine is secured to said driven machine by hinge and removable pintle means.

19. The power driven machine, power take off shaft, and power take off shaft safety retainer combination of claim 10, wherein said power driven machine is a grain auger.

* * * * *